US006768231B1

United States Patent
Osugi et al.

(10) Patent No.: US 6,768,231 B1
(45) Date of Patent: Jul. 27, 2004

(54) YOKE COMPARTMENT OF VOICE COIL MOTOR FOR HARD DISK DRIVE AND VOICE COIL MOTOR USING SAID YOKE COMPONENT

(75) Inventors: Ryo Osugi, Takefu (JP); Takashi Arikawa, Takefu (JP); Nobutaka Kobayashi, Takefu (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/658,014

(22) Filed: Sep. 8, 2000

(30) Foreign Application Priority Data

| Sep. 8, 1999 | (JP) | 11-254144 |
| Sep. 8, 1999 | (JP) | 11-254145 |
| Sep. 8, 1999 | (JP) | 11-254146 |
| Sep. 8, 1999 | (JP) | 11-254147 |
| Sep. 8, 1999 | (JP) | 11-254148 |

(51) Int. Cl.$^7$ .............................................. H02K 15/00
(52) U.S. Cl. .................................... 310/42; 360/264.8
(58) Field of Search ............................. 310/42–45, 66, 310/67 R, 216–218, 254, 258, 259; 360/264.7, 264.8, 264.9

(56) References Cited

U.S. PATENT DOCUMENTS

| 4,447,795 A | * | 5/1984 | Sefko et al. ................. 336/172 |
| 4,462,054 A | * | 7/1984 | Dong et al. ............... 360/266.7 |
| 4,888,506 A | * | 12/1989 | Umehara et al. .............. 310/13 |
| 4,945,269 A | * | 7/1990 | Kamm ........................ 310/15 |
| 5,113,099 A | * | 5/1992 | Wong et al. .................. 310/13 |
| 5,313,124 A | * | 5/1994 | Macpherson ................. 310/13 |
| 5,459,359 A | * | 10/1995 | Umehara ...................... 310/13 |
| 5,581,422 A | * | 12/1996 | Umehara ...................... 310/13 |
| 5,585,679 A | * | 12/1996 | Bracken et al. ............... 310/13 |
| 5,659,215 A | * | 8/1997 | Dunfield et al. ........ 310/154.21 |
| 5,663,601 A | * | 9/1997 | Wakabayashi et al. ......... 310/45 |
| 5,698,911 A | * | 12/1997 | Dunfield et al. .............. 310/12 |
| 5,731,642 A | * | 3/1998 | Ogawa ........................ 310/13 |
| 5,847,903 A | * | 12/1998 | Ogawa et al. ............ 360/264.8 |
| 5,943,194 A | * | 8/1999 | Jones et al. .............. 360/266.7 |
| 5,986,362 A | * | 11/1999 | Sukagawa et al. ............. 310/12 |
| 6,139,407 A | * | 10/2000 | Shinbo et al. .............. 451/113 |
| 6,185,076 B1 | * | 2/2001 | Shinbo et al. ........... 360/265.7 |
| 6,191,510 B1 | * | 2/2001 | Landin et al. ............... 310/254 |

FOREIGN PATENT DOCUMENTS

EP            0919326 A       6/1999

OTHER PUBLICATIONS

Patent Abstracts of Japan, vol. 007, No. 029 (M–191), Feb. 5, 1983 (JP 57 184665 A, Nov. 13, 1982).

* cited by examiner

Primary Examiner—Dang Le
(74) Attorney, Agent, or Firm—Birch, Stewart, Kolasch & Birch, LLP

(57) ABSTRACT

A deburring method of removing burrs present on the surface of a yoke component, made from a low steel carbon steel, of a voice coil motor for a hard disk drive, includes a first step of subjecting the yoke component to a barrel polishing treatment; and a second step of subjecting the yoke component to at least one of an abrasive grain fluidization treatment, a thermal deburring treatment, a magnetic polishing treatment, an ultrasonic deburring treatment, and a water jet deburring treatment.

6 Claims, 3 Drawing Sheets

11 (FINE SHEARING BURR)

12 (SHEARING BURR OF 0.5mm OR LESS IN THICKNESS)

YOKE COMPARTMENT OF VOICE COIL MOTOR FOR HARD DISK DRIVE AND VOICE COIL MOTOR USING SAID YOKE COMPONENT

BACKGROUND OF THE INVENTION

The present invention relates to a yoke component for making up a magnetic circuit of a voice coil motor for a hard disk drive, and a method of deburring the surface of the yoke component, and particularly to a method of deburring a yoke component, which is capable of removing burrs produced on all ridge lines, including ridge lines at finely machined portions, of the yoke component. The present invention also relates to a voice coil motor for a hard disk drive, using the yoke component from which burrs are thus removed.

A voice coil motor for a hard disk drive includes, as shown in FIG. 1, a rare-earth magnet "a" and a yoke component "b" for making up a magnetic circuit of the voice coil motor. In addition, character "c" designates a coil. In recent years, along with a tendency to increase the storage capacities of hard disks, flying heights of magnetic heads have come to be reduced, and to prevent occurrence of head crush due to the reductions in flying heights of the magnetic heads, voice coil motors have been increasingly required to be cleaned.

Of components of a voice coil motor, a yoke component manufactured by pressing or cutting has a disadvantage that it has high viscosity causing shearing burrs or cutting burrs. This is because the yoke component is mainly made from a low carbon steel having a high toughness for obtaining an excellent motor performance.

Further, in recent years, since hard disk drives have been miniaturized, yoke components for making up magnetic circuits of voice coil motors used for the hard disk drives have come to be miniaturized and to be complicated in shape. As a result, the number of yoke components having finely machined portions such as through-holes, bends, and threaded holes has been increased, thereby tending to increase the frequency of occurrence of burrs. For example, in a yoke component thus miniaturized and complicated in shape, shearing burrs or cutting burrs of 0.5 mm or less in thickness are often produced in through-holes or threaded holes of about 3 mm in diameter. These burrs adhering on the surface of the yoke component do not necessarily remain adhering thereon but may be easily dropped therefrom due to physical or chemical causes.

Even if burrs are not dropped from the surface of a yoke component, since the surface of the yoke component is subjected to nickel plating, the nickel plating film on the surface may be crushed and a nickel powder be dropped therefrom when an external impact force is applied to the burrs.

The drop of burrs leads to deterioration of the cleanness of a voice coil motor for a hard disk drive, and further causes head crush and the like if the dropped burrs collide with a magnetic head upon operation of the hard disk drive. In particular, since the flying height of a magnetic head has been recently reduced to 0.1 $\mu$m or less, the drop of burrs of 0.5 mm or less in thickness has become a cause of head crush.

If a dropped burr adheres on a hard disk, there arises a problem associated with breakage of data recorded in the hard disk because of the ferromagnetic property of the burr. In recent years, since the recording density of a hard disk has become 1 $GB/cm^2$ or more, the drop of a burr of about 0.5 mm in thickness has possibly led to serious breakage of data recorded in the hard disk.

To remove burrs on yoke components for making up magnetic circuits of voice coil motors for hard disk drives, various kinds of deburring methods have been proposed; however, any one of these methods has not succeeded to perfectly remove burrs on yoke components. For example, a deburring method using a barrel polishing treatment is effective to remove large burrs produced on ridge lines around the outer periphery of a yoke component; however, such a method is disadvantageous in that burrs of 0.5 mm or less in thickness present on finely machined portions, such as through-holes, bends, and threaded holes, of the yoke component cannot be removed because abrasive grains do not sufficiently collide therewith.

A burring method using a chemical polishing treatment is effective to remove micro-burrs of 0.1 mm or less in thickness present at any location of a yoke component; however, such a method is disadvantageous in that burrs of more than 0.1 mm and 0.5 mm or less in thickness present on a yoke component cannot be removed by dissolution because of a possibility that longer chemical polishing may dissolve the main body of the yoke component. In general, the chemical polishing treatment is additionally used to make small burrs of 0.5 mm or less present on finely machined portions such as through-holes, bends, or threaded holes, which burrs cannot be removed by barrel polishing because the abrasive grains are larger in size than the finely machined portions, and as described above, the chemical polishing treatment has not effect of perfectly removing such burrs of 0.5 mm or less.

A deburring method using an abrasive grain fluidization treatment is effective to remove whisker-like burrs having fine roots, produced typically upon cutting of a yoke component, by pressing viscoelastic media containing abrasive grains kneaded therein to burrs; however, such a method is disadvantageous in that burrs produced by shearing, which have roots wider than tips, cannot be perfectly removed at the roots. Further, a deburring method using a thermal deburring treatment is disadvantageous in that heat generated at burrs are easy to propagate to the main body of a yoke component, thereby making it difficult to remove the burrs by oxidation; a deburring method using a magnetic polishing treatment is disadvantageous in that even if needle media made from a ferromagnetic material collide with a burr, the burr cannot be removed at the root; and a deburring method using ultrasonic vibration or water pressure is disadvantageous in that burrs produced by shearing cannot be removed at the roots, and therefore, these methods are not generally used for deburring yoke components for making up magnetic circuits of voice coil motors for hard disk drives.

A prior art deburring method has generally used only the barrel polishing treatment or the barrel polishing treatment followed by the chemical polishing treatment to deburr yoke components for making up magnetic circuits of voice coil motors for hard disk drives; however, such a method has failed to remove burrs of 0.5 mm or less in thickness present on finely machined portions, such as through-holes, bends, and threaded holes, of a yoke component, and in some cases, the prior art method has adopted brushing to remove such burrs.

The brushing for finely machined portions on which fine burrs are produced, however, is difficult to be automated because the shapes of yoke components differ for each voice coil motor, and therefore, such brushing must be manually performed, to cause a problem in that the deburring cost is raised.

SUMMARY OF THE INVENTION

An object of the present invention is to provide a yoke component for making up a magnetic circuit of a voice coil motor for a hard disk drive, which yoke component has no burr on all ridge lines, particularly, ridge lines at finely machined portions, of the yoke component; to provide a method of deburring a yoke component for making up a magnetic circuit of a voice coil motor for a hard disk drive, which is capable of certainly, efficiently deburring the yoke component; and to provide a voice coil motor for a hard disk drive, using a yoke component from which burrs are thus removed.

The present inventor has made examination to achieve the above object, that is, to certainly, efficiently deburr a yoke component made from a low carbon steel on which burrs are produced upon shearing or cutting work of the yoke component, and found that burrs present on all ridge lines, particularly, ridge lines at finely machined portions (for example, through-holes, threaded holes and recesses, each of which has an diameter of 10 mm or less, and further bends each having a radius of curvature of 5 mm or less) are difficult to be removed only by a barrel polishing treatment because abrasive grains cannot be sufficiently collide with the burrs present on the finely machined portions; however, these burrs present on all ridge lines of the yoke component can be certainly removed by subjecting the yoke component to the barrel polishing treatment, and then subjecting the yoke component to at least one of a thermal deburring treatment, a magnetic polishing treatment, an ultrasonic deburring treatment, and a water jet deburring treatment. The present inventor has thus accomplished the present invention on the basis of the above-described knowledge.

Therefore, according to a first aspect of the present invention, there is provided a yoke component, made from a low carbon steel, for making up a magnetic circuit of a voice coil motor for a hard disk drive, wherein the yoke component has on any ridge line thereof no burr of 0.5 mm or less in thickness.

According to a second aspect of the present invention, there is provided a deburring method of removing burrs present on the surface of a yoke component, made from a low steel carbon steel, of a voice coil motor for a hard disk drive, including: a first step of subjecting the yoke component to a barrel polishing treatment; and a second step of subjecting the yoke component to at least one of an abrasive grain fluidization treatment, a thermal deburring treatment, a magnetic polishing treatment, an ultrasonic deburring treatment, and a water jet deburring treatment.

According to a third aspect of the present invention, there is provided a voice coil motor for a hard disk drive, including: a yoke component, made from a low carbon steel, for making up a magnetic circuit of the voice coil motor, wherein the yoke component has on any ridge line thereof no burr of 0.5 mm or less in thickness.

BRIEF DESCRIPTION OF THE DRAWINGS

FIGS. 2A and 2B are views typically showing two kinds of forms of burrs present on a yoke component, wherein FIG. 2A shows a shearing burr produced on a yoke component upon pressing work of the yoke component, and FIG. 2B shows a whicker-like burr produced on a yoke component upon cutting work of the yoke component; and FIGS. 3A to 3D are views typically showing steps of removing burrs present at the opening edge of a through-hole of a yoke component, wherein FIG. 3A shows a state before barrel polishing; FIG. 3B shows a state after barrel polishing; FIG. 3C shows a state after abrasive grain fluidization treatment; and FIG. 3D shows a state after chemical polishing.

DETAILED DESCRIPTION OF THE INVENTION

Figure 1:
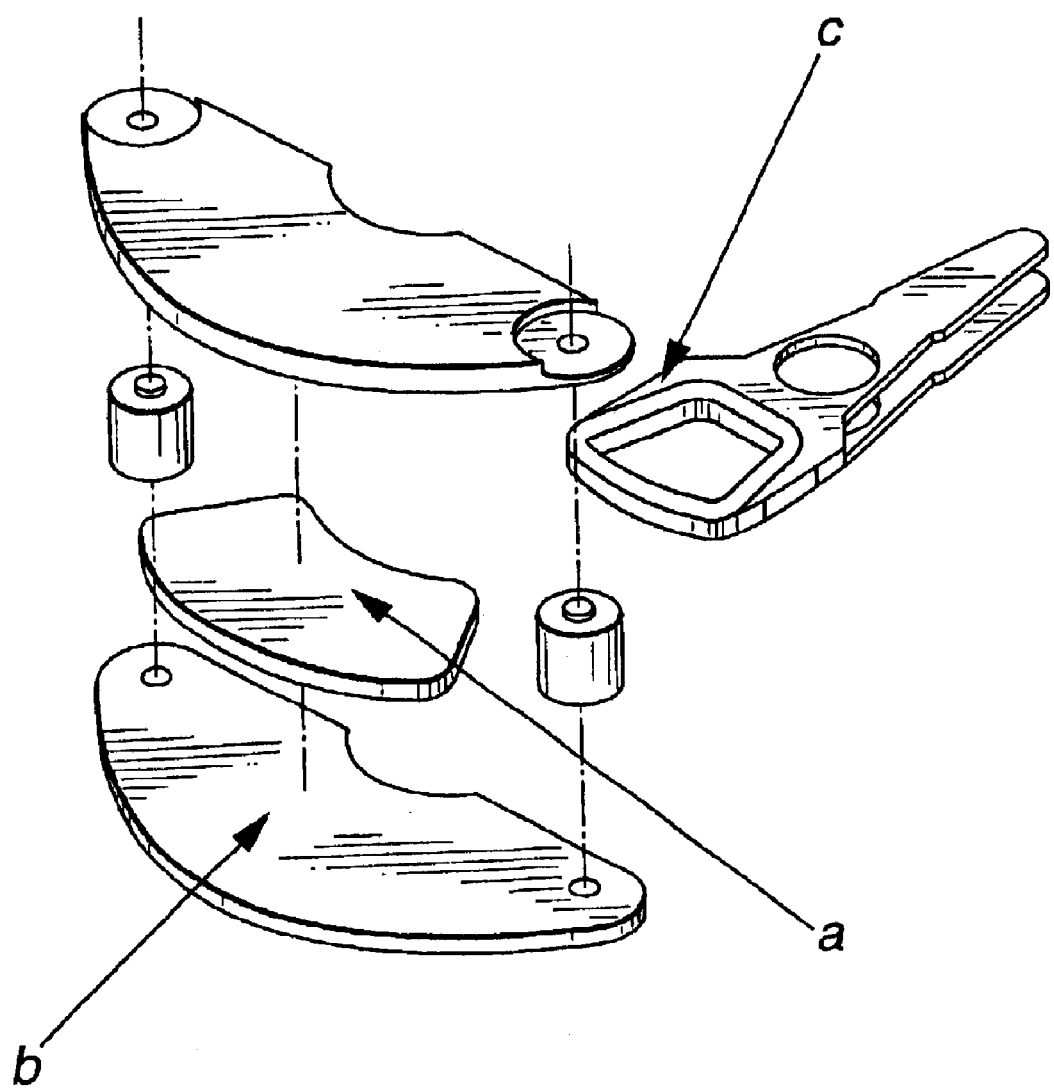
FIG. 1 is a schematic perspective view of a voice coil motor.
Figure 2A:
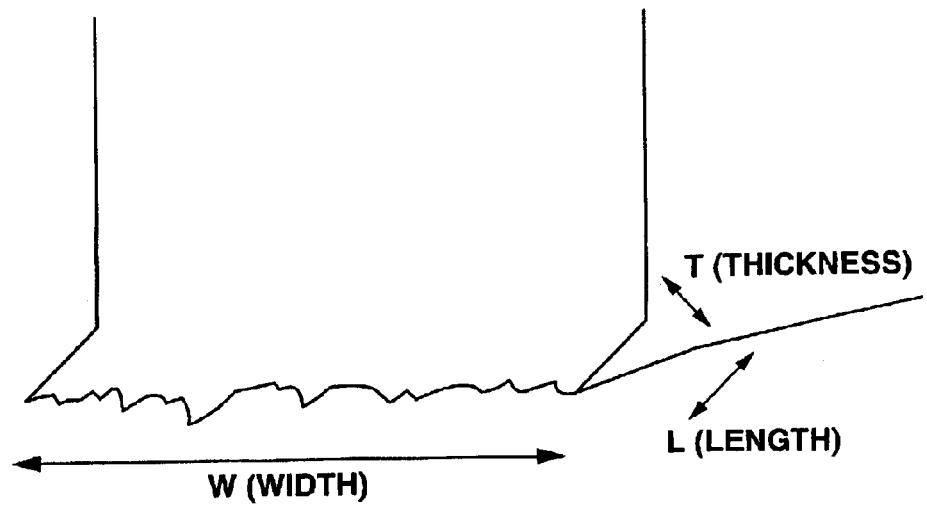
Figure 2B:
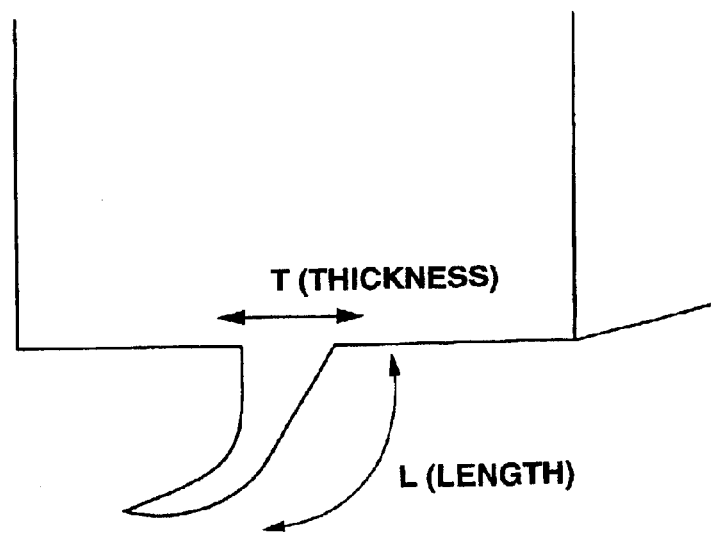

Burrs to be removed by a deburring method of the present invention are burrs of 0.5 mm or less in thickness produced on all ridge lines, particularly, ridge lines at finely machined portions, of a yoke component made from a low carbon steel for making up a magnetic circuit of a voice coil motor for a hard disk drive. FIGS. 2A and 2B are views typically showing two kinds of forms of burrs and defining a thickness of each burr, wherein FIG. 2A shows a shearing burr produced on a yoke component upon pressing work of the yoke component, and FIG. 2B shows a whisker-like burr produced on a yoke component upon cutting work of the yoke component. The forms of burrs to be removed by the deburring method of the present invention, however, are limited thereto.

The deburring method of the present invention includes: (1) a first step of subjecting a yoke component, on which burrs of the above-described forms are present, to a barrel polishing treatment; and (2) a second step of subjecting the yoke component to at least one of an abrasive grain fluidization treatment, a thermal deburring treatment, a magnetic polishing treatment, an ultrasonic deburring treatment, and a water jet deburring treatment. Additionally, the deburring method of the present invention may include (3) a third step of subjecting the yoke component to a chemical polishing treatment as needed.

Hereinafter, each of the above-described treatments of the deburring method of the present invention will be described.

Deburring Step by Barrel Polishing Treatment

The deburring by barrel polishing treatment is intended to remove burrs on ridge lines with which abrasive grains can sufficiently collide, other than burrs on ridge lines at finely machined portions such as through-holes, bends, and threaded holes, of a yoke component for making up a magnetic circuit of a voice coil motor for a hard disk drive. The barrel polishing treatment is also intended to make abrasive grains collide to shearing burrs of 0.5 mm or less in thickness at finely machined portions such as through-holes, bends, and threaded-holes, to forcibly roll the burrs and make thin the roots thereby by collision of the abrasive grain which is Insufficient to remove the burrs, thereby forming the burrs into shapes easy to be removed at the subsequent step using at least one of the abrasive grain fluidization treatment, a thermal deburring treatment, a magnetic polishing treatment, an ultrasonic deburring treatment, or a water jet deburring treatment.

The barrel polishing treatment can be performed by charging a yoke component, abrasive grains mainly made from alumina. silica, or magnesia, and water to which a rust-preventive solution is added, into a rotary barrel, vibration barrel, or centrifugal barrel, and making the abrasive grains collide the yoke component by rotation or vibration. The shape of each abrasive grain may be a spherical or triangular shape, and the size of each abrasive grain may be 3 mm or more, particularly, 5 mm or more and 20 mm or less, particularly, 15 mm or less, and generally be about 10 mm. It may be undesirable to use abrasive grains each having a size smaller than that described above, that is, less than 3 mm. This is because such small abrasive grains may remain in threaded holes or recesses. The barrel polishing treatment can remove burrs, each having a thickness ranging from 0.5 mm to 1.0 mm, produced on ridge lines with which abrasive grains can sufficiently collide along various directions, other than burrs produced at finely machined portions such as through-holes, bends, and threaded holes, of the yoke component. The barrel polishing treatment, however, cannot remove but only roll shearing burrs of 0.5 mm or less in thickness produced at finely machined portions such as through-holes, bends, and threaded holes because abrasive grains collide with the burrs along limited directions. Here, as the effect of the barrel polishing treatment, although the shearing burrs of 0.5 mm or less cannot be removed by the barrel polishing treatment, the roots thereof become thinner than those of the original burrs before barrel polishing, and therefore, such burrs are easy to be removed at the subsequent step using at least one of the abrasive grain fluidization treatment, a thermal deburring treatment, a magnetic polishing treatment, an ultrasonic deburring treatment, or a water jet deburring treatment.

According to the prior art deburring method, shearing burrs of 0.5 mm or less in thickness produced at finely machined portions, such as through-holes, bends, and threaded holes, of a yoke component, which cannot be removed by the barrel polishing treatment, are left as they are or are made smaller by additional chemical polishing. It should be noted that as described above, the additional chemical polishing fails to perfectly remove the shearing burrs of 0.5 mm or less which have remained after barrel polishing.

Deburring Step by Abrasive Grain Fluidization Treatment

The deburring by abrasive grain fluidization treatment is intended to remove burrs of 0.5 mm or less produced at finely machined portions, such as through-holes, bends, and threaded holes, of a yoke component for making up a magnetic circuit of a voice coil motor for a hard disk drive, which burrs cannot be removed by barrel polishing.

The abrasive grain fluidization treatment is performed by mechanically pressing special clay-like viscoelastic media containing abrasive grains kneaded therein to a portion to be deburred, thereby deburring the portion. In this case, the elastic effect of the viscoelastic media is added to the abrasive grains kneaded therein, to produce a polishing pressure and a moving speed of abrasive grains necessary for polishing the portion to be deburred. In this treatment, there is used an apparatus capable of pressing the viscoelastic media in both the upward and downward directions, to reciprocally move the media, thereby enhancing the deburring ability.

In the case of removing burrs present at finely machined portions, such as through-holes, bends, and treaded holes, of a yoke component for making up a magnetic circuit of a voice coil motor for a hard disk drive by using the above-described apparatus, a flow passage to fluidize the media to the portion to be deburred is formed in matching to the portion to be deburred by using a jig. In this case, for enhancing the mass-productivity by simultaneously performing the abrasive grain fluidization treatment to a plurality of yoke components, flow passages may be formed by the jigs in such a manner as to be matched to the plurality of yoke components laminated to each other. The viscoelasticity of the media is not particularly limited but may be preferably not high so much if the media is used for removing burrs of 0.5 mm or less present at finely machined portions, such as through-holes, bends, and treaded holes, of a yoke component for making up a magnetic circuit. To easily remove the media from a yoke component having been subjected to abrasive grain fluidization, fat and oil may be previously contained in the media. The material of the abrasive grains kneaded in the media may be selected from silicate carbide, boron carbide, or diamond, and the particle size thereof is selected in a range of #50 to #500 in accordance with the production state of burrs to be removed. The pressure may be selected in a range of 10 to 100 kg/cm$^2$ in accordance with the production state of burrs to be removed. Since the through-holes, threaded holes, or recesses are filled with the media after the deburring by abrasive grain fluidization, the media is required to be removed therefrom by air cleaning or water cleaning. With this abrasive grain fluidization treatment, shearing burrs of 0.5 mm or less in thickness present at finely machined portions, particularly, at through-holes and bends formed by punching can be removed in combination with the effect of the previous step using barrel polishing, that is, the effect of forcibly rolling the burrs thereby making thin the roots thereof. It should be noted that the above shearing burrs of 0.5 mm or less cannot be removed by the prior art single abrasive grain fluidization treatment.

Whisker-like burrs having fine roots, which are produced at finely machined portions, such as threaded holes or recesses, upon cutting work of a yoke component, can be perfectly removed by collision of the abrasive grains therewith during the abrasive grain fluidization treatment.

The apparatus used for the abrasive grain fluidization treatment has been described in ["Deburring Method Using Abrasive Grain Fluidization Treatment", Mechanical Technology, Vol. 36, No. 9 (the August Number in 1988), Nikkan Kogyo Shinbunsha K. K.].

If the deburring by abrasive grain fluidization is performed without barrel polishing as the previous step, as described above, shearing burrs which have roots wider than tips cannot be removed at the roots even if the viscoelastic media containing abrasive grains kneaded therein are pressed to the burrs, and therefore, shearing burrs on all ridge lines, including burrs at finely machined portions, cannot be removed at all.

Deburring Step by Thermal Deburring Treatment

The deburring by thermal deburring treatment is intended to remove burrs of 0.5 mm or less produced at finely machined portions, such as through-holes, bends, and threaded holes, of a yoke component for making up a magnetic circuit of a voice coil motor for a hard disk drive, which burrs cannot be removed by barrel polishing.

The thermal deburring treatment is performed by putting yoke components in a gastight combustion chamber, gastightly closing the combustion chamber, and feeding a compressed combustion gas in the combustion chamber through a burnable gas inlet. The feed pressure of the combustion gas may be set in a range of 3 to 10 atm in accordance with the number of yoke components and the production state of burrs to be removed. To avoid deformation of yoke components, the feed pressure of the combustion gas may be set at a value being as small as possible. The composition of the combustion gas is represented by $CH_4:O_2=1:2.5$. That is to say, the combustion gas contains oxygen in an amount larger than that necessary for combustion of methane. The excess oxygen is consumed for combustion of burrs. Accordingly, the optimum mixing ratio of the combustion gas may be set at a value matched to the production state of burrs in order to prevent part of the burrs from remaining due to the lack of combustion by insufficient oxygen or to avoid significant oxidation of the main body of the yoke component due to excess oxygen.

When the combustion gas supplied in the combustion chamber is ignited by an ignition plug, such a combustion gas is instantly burned, to cause heat waves of about 3000° C., thereby removing burrs by oxidation. At this time, the surface of the main body of the yoke component is slightly oxidized to form an oxide film. Such an oxide film may be desirable to be removed by acid cleaning or the like after the thermal deburring treatment. With this thermal deburring treatment, shearing burrs of 0.5 mm or less in thickness present at finely machined portions, particularly, at through-holes and bends formed by punching can be removed in combination with the effect of the previous step using barrel polishing, that is, the effect of forcibly rolling the burrs thereby making thin the roots thereof. It should be noted that the above shearing burrs of 0.5 mm or less cannot be removed by the prior art single thermal deburrlng treatment.

Whisker-like burrs having fine roots, which are produced at finely machined portions, such as threaded holes or recesses, upon cutting work of a yoke component, can be perfectly oxidized and removed by the thermal deburrlng treatment.

The thermal deburring apparatus has been described in ["Instant Deburring by Using Thermal Impact", Mechanical Technology, Vol. 29, No. 8, pp. 135–137 (1981)].

If the thermal deburring treatment is performed without barrel polishing as the previous step, as described above, shearing burrs which have roots wider than tips cannot be removed by oxidation because heat generated at the burrs is easy to propagate to the main body of the yoke component, and therefore, shearing burrs on all ridge lines, including burrs at finely machined portions, cannot be removed at all.

Deburring Step by Magnetic Polishing Treatment

The deburring by magnetic polishing treatment is intended to remove burrs of 0.5 mm or less produced at finely machined portions, such as through-holes, bends, and threaded holes, of a yoke component for making up a magnetic circuit of a voice coil motor for a hard disk drive, which burrs cannot be removed by barrel polishing.

The magnetic polishing treatment is performed as follows: First, ferromagnetic stainless steel media in the forms of needles each having a diameter of 0.2 to 1.0 mm and a length of about 5 mm and parts to be deburred are put in a vessel. At this time, a cleaning solution for preventing the parts to be deburred and the media from being contaminated is simultaneously poured in the vessel. The vessel is put in a magnetic field in which N and S poles are alternately changed. As the polarities of the magnetic field are quickly changed from each other, the ferromagnetic media are repeatedly, strongly stirred and vibrated, and are inserted in finely machined portions such as through-holes, bends, and threaded holes, to thereby remove burrs by collision therewith. As a method of changing the N and S poles in the magnetic field in the vessel from each other, there may be adopted a method of disposing the vessel between electric magnets to which an alternating current is applied, or a method of rotating a disk, on which strong magnets are provided with N and S poles alternately arranged, at a high speed under a base on which the vessel is mounted.

In general, parts to be deburred by magnetic polishing are non-magnetic bodies. Ferromagnetic parts are difficult to be deburred by magnetic polishing because such parts are moved in the same direction as that of the ferromagnetic media when the N and S poles in the magnetic field are changed from each other. However, by fixing ferromagnetic parts in a vessel by means of non-magnetic jigs, the media are allowed to strongly collide with the ferromagnetic parts, thereby removing burrs present thereon.

A yoke component is a ferromagnetic body made from a low carbon steel. Accordingly, by fixing the yoke component by means of a jig, burrs present on the yoke component can be removed by magnetic polishing. In this case, to make the media certainly collide with the yoke component, the yoke component may be desirable to be fixed with its shearing direction directed in parallel to the direction of the magnetic field.

The charged amount of yoke components is determined in accordance with the size of a vessel in which the yoke components are to be put, and the design of jigs for fixing the yoke components. The frequency for changing the polarities of a magnetic field in the vessel is set at 50–60 Hz or more for strongly stirring and vibrating the media, and the change in polarities of the magnetic field at a high frequency can be easily performed by adopting the method of rotating a disk, on which strong magnets are provided with N and S poles alternately arranged, at a high speed under a base on which the vessel is mounted.

The thickness of each of the media may be selected in a range of about 0.5 to 1.0 mm in accordance with the production state of burrs of 0.5 mm or less in thickness present at finely machined portions, such as through-holes, bends, and thread holes, of a yoke component for making up a magnetic circuit of a voice coil motor for a hard disk drive, which burrs cannot be removed by barrel polishing. The use of the media each having a thickness of about 0.2 mm reduces the deburring effect because of the light weights of the media. Such fine media are generally used for deburring resin based parts.

The polishing time is set in a range of about 1 to 10 min in accordance with the production state of burrs, and the frequency for changing the polarities of a magnetic field. Since the surface of the yoke component is wet and is thereby liable to be rusted after magnetic polishing, it may be desirable to wash the yoke component with water for removing the cleaning solution therefrom, and to dry the yoke component by using an oven or air blower.

With this magnetic polishing treatment, shearing burrs of 0.5 mm or less in thickness present at finely machined portions, particularly, at through-holes and bends formed by punching can be removed in combination with the effect of the previous step using barrel polishing, that is, the effect of forcibly rolling the burrs thereby making thin the roots thereof. It should be noted that the above shearing burrs of 0.5 mm or less produced by punching cannot be removed by the prior art single magnetic polishing treatment.

Whisker-like burrs having fine roots, which are produced at finely machined portions, such as threaded holes or recesses, upon cutting work of a yoke component, can be perfectly removed by collision of the media therewith during the magnetic polishing treatment.

The magnetic polishing apparatus has been described in ["Magnetic Polishing Method Capable of Removing Micro-Burrs on Product without Deformation and Efficiently Finishing the Product" [b (2)] JA G0937A Tool Engineer (JPN) 38 [2] 34–39 ('97)].

If the magnetic polishing is performed without barrel polishing as the previous step, as described above, shearing burrs which have roots wider than tips cannot be removed at the roots even if the media composed of ferromagnetic needles collide with the burrs during the magnetic polishing treatment, and therefore, shearing burrs on all ridge lines, including burrs at finely machined portions, cannot be removed at all.

Deburring Step by Ultrasonic Deburring Treatment

The deburring by ultrasonic deburring treatment is intended to remove burrs of 0.5 mm or less produced at finely machined portions, such as through-holes, bends, and threaded holes, of a yoke component for making up a magnetic circuit of a voice coil motor for a hard disk drive, which burrs cannot be removed by barrel polishing.

The ultrasonic deburring treatment is performed by putting a yoke component to be deburred in water, and emitting strong ultrasonic waves into the water, to impart strong vibration to burrs on the yoke component by making use of cavitation (growth and extinction of micro-bubbles) in the resonance region of the ultrasonic waves, thereby removing the burrs thus fatigued by vibration. The resonance region in which cavitation occurs is limited to a specific area calculated by the frequency of the ultrasonic waves, and therefore, a location to be deburred may be desirable to be fixed in the specific area.

In the case of deburring a plurality of locations of a yoke component, the yoke component suspended from a jig into water may be swung. The frequency of the ultrasonic waves used for this ultrasonic deburring treatment may be as low as about 25 kHz. The use of the ultrasonic waves having a frequency more than 30 kHz increases the resonance region in water but reduces the cavitation to such an extent as to make impossible the deburring. Meanwhile, the use of ultrasonic waves having a frequency lower than 20 kHz, which is near audio frequencies, may cause large noise. Accordingly, the frequency of the ultrasonic waves is preferably in a range of 20 to 30 kHz. The output of an ultrasonic wave generator used for this ultrasonic deburring treatment may be as high as about 1200 W, and ultrasonic oscillators may be densely arranged for enhancing the deburring ability.

The lower the temperature of water used for ultrasonic deburring treatment, the higher the cavitation effect. From this viewpoint, the temperature of water used for ultrasonic deburring treatment may be controlled at a low temperature of 10° C. or less for increasing the cavitation effect. Since oil or air in water obstructs the occurrence of cavitation, the use of pure water or deaeration before deburring may be carried out for enhancing the deburring effect. The ultrasonic deburring treatment time may be set in a range of 30 sec to 10 min in accordance with the shapes of burrs. Since the surface of the yoke component is wet and is thereby liable to be rusted after ultrasonic deburring, the yoke component may be desirable to be dried by using an oven or air blower. With this ultrasonic deburring treatment, shearing burrs of 0.5 mm or less in thickness present at finely machined portions, particularly, at through-holes and bends formed by punching can be removed in combination with the effect of the previous step using barrel polishing, that is, the effect of forcibly rolling the burrs thereby making thin the roots thereof. It should be noted that the above shearing burrs of 0.5 mm or less cannot be removed by the prior art single ultrasonic deburring treatment.

Whisker-like burrs having fine roots, which are produced at finely machined portions, such as threaded holes or recesses, upon cutting work of a yoke component, can be perfectly removed by vibration due to ultrasonic waves.

The ultrasonic deburring apparatus has been described in ["Precise Surface Finish and Burr Technology-Removal of Burrs and Surface Finish by Ultrasonic Cleaning" [b(2)] JA F145A, Mechanical Technology, (JPN) 44 [(2)]].

If the ultrasonic deburring is performed without barrel polishing as the previous step, as described above, shearing burrs which have roots wider than tips cannot be removed at the roots even by vibration due to ultrasonic waves, and therefore, shearing burrs on all ridge lines, including burrs at finely machined portions, cannot be removed at all.

Deburring Step by Water Jet Deburring Treatment

The deburring by water jet deburring treatment is intended to remove burrs of 0.5 mm or less produced at finely machined portions, such as through-holes, bends, and threaded holes, of a yoke component for making up a magnetic circuit of a voice coil motor for a hard disk drive, which burrs cannot be removed by barrel polishing.

The water jet deburring treatment is performed by discharging a water jet at a high pressure 100 to 700 kg/cm$^2$ from a nozzle to a yoke component by a high pressure pump such as a plunger pump, thereby removing burrs on the yoke component by collision of the water jet with the burrs. The nozzle may be of a direct-jet type for preventing a water jet at a high pressure from being spread, and also may have only one discharge port for increasing the deburring ability at maximum.

The discharge pressure, distance between the nozzle and a yoke component, flow rate of discharged water, and discharge time should be set at such values as not to deform or damage the yoke component. Concretely, to obtain a sufficient deburring effect, the distance between the nozzle and the yoke component may be set in a range of 40 to 100 mm; the flow rate of the discharge water may be set in a range of 10 to 50 L/min, and the discharge time may be set in a range of 1 to 10 sec.

First, a position or positions of one burr or a plurality of burrs of 0.5 mm or less in thickness at one or a plurality of finely machined portions, such as through-holes, bends, or threaded holes, of a yoke component, which burr or burrs cannot be removed by barrel polishing, has or have been previously checked. If one position of the burr has been checked, the yoke component is fixed by means of a jig with such a position directed to the nozzle, and a water jet at a high pressure is discharged from the nozzle to the position, to thereby remove the burr. If a plurality of positions of the burrs have been checked, a water jet at a high pressure can be made to collide with the plurality of burrs on the yoke component by moving one or both of the nozzle and the yoke component. Further, a water jet at a high pressure can be made to collide with any position of a yoke component by swinging one or both of the nozzle or the yoke component. In the case of moving one or both of the nozzle and a yoke component, the moving speed may be set at a value being as low as 20 mm/sec or less. If the moving speed is more than 20 mm/sec, it may be difficult to ensure a sufficient deburring effect.

To increase the probability of collision of a water jet at a high pressure with burrs, the water jet may be discharged on both surfaces of a yoke component. Since the surface of the yoke component is wet and is thereby liable to be rusted after water jet deburring, the yoke component may be desirable to be dried by using an oven or air blower. With this water jet deburring treatment, shearing burrs of 0.5 mm or less in thickness present at finely machined portions, particularly, at through-holes and bends formed by punching can be removed in combination with the effect of the previous step using barrel polishing, that is, the effect of forcibly rolling the burrs thereby making thin the roots thereof. It should be noted that the above shearing burrs of 0.5 mm or less cannot be removed by the prior art single water jet deburring treatment.

Whisker-like burrs having fine roots, which are produced at finely machined portions, such as threaded holes or recesses, upon cutting work of a yoke component, can be perfectly removed by the impact applied by a water jet.

The water jet deburring apparatus has been described in ("Advanced Cleaning Technology Handbook"—Chapter II Physical Cleaning Media and Cleaning Method, Paragraph 2 Cleaning Method, Section 5 High Pressure Water Cleaning—, edited by Advanced Cleaning Technology Handbook Editorial Committee and published by K.K. Industrial Technology Service Center, 1996).

If the water jet deburring treatment is performed without barrel polishing as the previous step, as described above, shearing burrs which have roots wider than tips cannot be removed at the roots even if a high water pressure is applied to the burrs, and therefore, shearing burrs on all ridge lines, including burrs at finely machined portions, cannot be removed at all.

In rare cases, during the barrel polishing treatment as the first step and the abrasive grain fluidization treatment or the like at second step, fine shearing burrs of 0.1 mm or less in thickness present at finely machined portions of a yoke component may fall onto the main body of the yoke component to be in close-contact therewith. These burrs cannot be perfectly removed by the first and second deburring steps. In these cases, it is effective to dissolve and remove the remaining burrs by a chemical polishing treatment as the finish step. The chemical polishing is performed by dipping a yoke component in a water solution mainly containing 1 to 40% of hydrogen peroxide, ammonium hydrogen difluoride, or phosphoric acid for 10 sec to 10 min, thereby chemically dissolving burrs on the yoke component.

Since the surface of the yoke component is activated after chemical polishing, the yoke component may be desirable to be immediately subjected to water washing and acid cleaning, and to nickel or copper plating. It should be noted that the abrasive grain fluidization treatment or the like at the second step, the chemical polishing treatment at the final step, and plating can be continuously performed by commonly using a jig for fixing or suspending a yoke component.

Figure 3A:
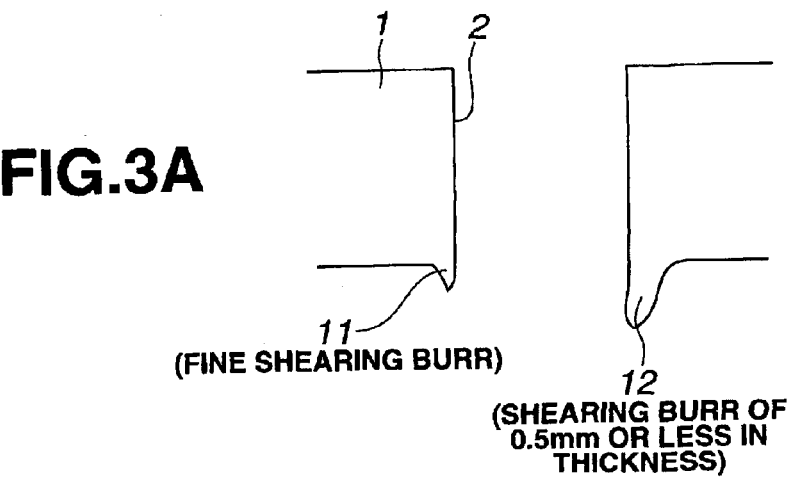
Figure 3B:
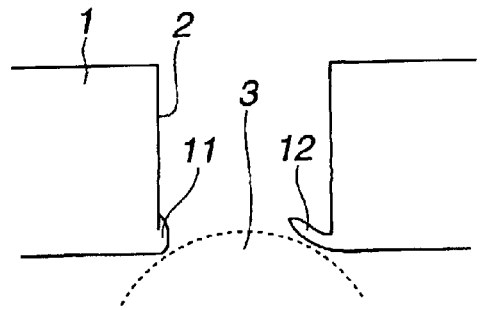
Figure 3C:
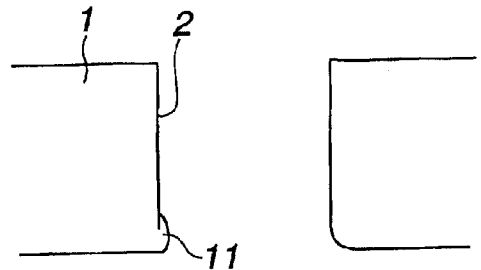
Figure 3D:
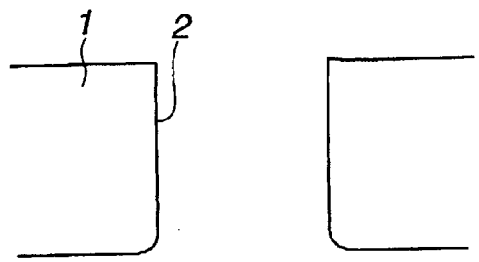

FIGS. 3A to 3D typically show stages in which shearing burrs produced at the opening edge of a through-hole are removed in the barrel polishing treatment at the first step, the abrasive grain fluidization treatment or the like at the second step, and the additional chemical polishing treatment at the final step, wherein FIG. 3A shows a state before barrel polishing; FIG. 3b shows a state after barrel polishing; FIG. 3C shows a state after abrasive grain fluidization or the like as the second step; and FIG. 3D shows a state after chemical polishing. In the figures, reference numeral 1 designates a main body of a yoke component, and 2 is a through-hole formed in the main body. In the state before barrel polishing, shown in FIG. 3A, a fine shearing burr 11 and a shearing burr 12 of 0.5 mm or less in thickness are formed at the outer peripheral edge of the through-hole 2 in such a manner as to project outwardly in the depth direction of the through-hole 2. Since the root of each of the burrs 11 and 12 is wider than a tip thereof, such a burr cannot be removed only by the abrasive grain fluidization treatment or the like as the second step. When the yoke component 1 having the burrs 11 and 12 is subjected to barrel polishing (see FIG. 3B), an abrasive grain 3 collides with the burrs 11 and 12, to press the burrs 11 and 12 inwardly, that is, toward the inside of the through-hole 2. The barrel polishing does not remove but roll the burrs 11 and 12, to thereby make thin the roots thereof. As shown in FIG. 3B, the fine shearing burr 11 may often fall on the inner peripheral wall of the through-hole 2, and in some cases, the tip side of the burr 11 may come in contact with the inner peripheral wall of the through-hole 2. The yoke component is then subjected to the abrasive grain fluidization treatment or the like as the second step. At this time, as shown in FIG. 3C, since the roots of the burrs 11 and 12 have been made thin by barrel polishing, the burrs 11 and 12 are removed by the abrasive grain fluidization treatment or the like as the second step. In this case, there is a possibility that the fine shearing burr 11 having fallen on the inner peripheral wall of the through-hole 2 is not perfectly removed by the abrasive grain fluidization treatment or the like as the second step. As shown in FIG. 3D, such a remaining portion of the fine shearing burr 11 is perfectly removed by chemical polishing. It should be noted that the deburring stages appeared when the deburring method of the present invention is carried out are not limited to those shown in FIGS. 3A to 3D.

With the above-described steps, it is possible to remove all large and small burrs, including shearing burrs of 0.5 mm or less in thickness present at finely machined portions, such as through-holes, bends, and threaded holes, of a yoke component for making up a magnetic circuit of a voice coil motor for a hard disk drive, which shearing burrs of 0.5 mm or less in thickness cannot be removed by the prior art single deburring step of subjecting the yoke component to any one of the barrel polishing treatment, abrasive grain fluidization treatment, thermal deburring treatment, magnetic polishing treatment, ultrasonic deburring treatment, and water jet deburring treatment. The yoke component, from which all the burrs have been removed, is then subjecting to plating, to be thus finished as a yoke component of a voice coil motor in which the possibility of drop of burrs harmful for a hard disk drive is eliminated.

The yoke component of the present invention is therefore characterized in that burrs on all ridge lines, including burrs of 0.5 mm or less in thickness present at finely machined portions, such as through-holes, threaded holes and recesses each of which has an diameter of 10 mm or less, and bends each of which has a radius of curvature of 5 mm or less, of the yoke component are removed by the above-described deburring method of the present invention.

The voice coil motor of the present invention is therefore characterized by adhesively bonding a magnet to the yoke component of the present invention, followed by magnetization, and assembling the yoke component with other components. It should be noted that the configurations of other components of the voice coil motor in which the above yoke component is assembled may be the same as those publicly-known.

EXAMPLES

The present invention will be more clearly understood by way of, while not limited thereto, the following examples:

Inventive Example 1

Yoke components, each having a weight of 30 g, for making up magnetic circuits of voice coil motors for hard disk drives were prepared by punching a cold-rolled steel sheet (grade: SPCC specified in JIS) of 3.2 mm in thickness. Each yoke component having a flat-shape of about 5 cm in diagonal length has two through-holes each having an diameter of 3 mm and one rolled tap having an diameter of 2.5 mm. These through-holes and rolled tap, which are opened in the thickness direction of the yoke component, are used for positioning the voice coil motor to the hard disk drive upon assembly thereof. The yoke component has shearing burrs produced, upon punching of the yoke component, on all ridge lines on the press-die side, including ridge lines of the through-holes (diameter: 3 mm), and also whisker-like burrs produced, upon thread-cutting of the rolled-tap (diameter: 2.5 mm), on a thread of the rolled tap. These yoke components are taken as test pieces. The test pieces were then subjected in sequence to a rotary barrel polishing treatment and an abrasive grain fluidization treatment under the following conditions:

Deburring Step by Rotary Barrel Polishing Treatment charged amount of yoke components: 50 pieces+30 g
charged amount of spherical abrasive grains mainly made from alumina or silica (outside diameter: 15 mm): 5 kg
number of revolution: 46 rpm
polishing time: 1 hr Deburring Step by Abrasive Grain Fluidization Treatment media: polymer base in which powder (particle size: # 320 specified in JIS) of silicon carbide is kneaded
pressure: 50 kg/cm$^2$
pressing time for each side in reciprocating motion: 30 sec
number of reciprocating motion: one time After barrel polishing, the two through-holes (diameter: 3 mm) and one rolled-tap (diameter: 2.5 mm) for each test piece were deburred for 1 min in total by abrasive grain fluidization under the above conditions.

The test pieces thus deburred were subjected to nickel plating. The shearing burrs on usual ridge line portions, shearing burrs on ridge line portions at opening edges of the through-holes (diameter: 3 mm), and whisker-like burrs in the rolled-tap (diameter: 2.5 mm) of each test piece were observed. The results are shown in Table 1.

For comparison, the following comparative test pieces were prepared, and deburring states of the test pieces were evaluated in the same manner as described above.

Comparative Example 1

The test pieces were subjected only to the above-described barrel polishing treatment.

Comparative Example 2

The test pieces were subjected to the above-described barrel polishing treatment and a chemical polishing treatment.

Comparative Example 3

The test pieces were subjected only to the above-described abrasive grain fluidization treatment.

The chemical polishing treatment was performed by diluting a chemical polishing solution mainly containing hydrogen peroxide or ammonium hydrogen difluoride (CPL-100, produced by Mitsubishi Gas Chemical Company, Inc.) by three times, and dipping each test piece in the chemical polishing solution kept at 20° C. for 1 min.

The results are shown in Table 1.

TABLE 1

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| Inventive Example 1 | ~0.1 mm | ⊚ | ~0.1 mm | ○ | ~0.1 mm | ⊚ |
| | 0.1 to 0.5 mm | ⊚ | 0.1 to 0.5 mm | ⊚ | 0.1 to 0.5 mm | ⊚ |
| | 0.5 to 1.0 mm | ⊚ | 0.5 to 1.0 mm | — | 0.5 to 1.0 mm | — |
| Comparative Example 1 | ~0.1 mm | ⊚ | ~0.1 mm | X | ~0.1 mm | X |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 2 | ~0.1 mm | ⊚ | ~0.1 mm | ○ | ~0.1 mm | ○ |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 3 | ~0.1 mm | X | ~0.1 mm | X | ~0.1 mm | ⊚ |
| | 0.1 to 0.5 mm | X | 0.1 to 0.5 mm | X | 0.1 to 0.5 mm | ⊚ |
| | 0.5 to 1.0 mm | X | 0.5 to 1.0 mm | — | 0.5 to 1.0 mm | — |

⊚: burrs are perfectly removed for all yoke components observed
○: burrs are nearly perfectly removed (burrs slightly remain for yoke components)
Δ: treatment is little effective for deburring (burrs remain for most of yoke components)
X: burrs are not removed at all for all yoke components observed
—: burrs are not present on yoke components before deburring treatment In Inventive Example 1, the test pieces were subjected to chemical polishing after abrasive grain fluidization treatment. As a result, the shearing burrs of 0.1 mm or less shown in Table 1 were perfectly removed.

Inventive Example 2

The same test pieces as those used in Inventive Example 1 were subjected in sequence to a rotary barrel polishing treatment and a thermal deburring treatment in the following conditions:

Deburring Step by Rotary Barrel Polishing Treatment charged amount of yoke components: 50 pieces+30 g
charged amount of spherical abrasive grains mainly made from alumina or silica (outside diameter: 15 mm): 5 kg
number of revolution: 46 rpm
polishing time: 1 hr Thermal Deburring Treatment composition of combustion gas: $CH_4:O_2=1:2.5$
charging pressure of mixed gas: 7.0 kg/cm$^2$
charged amount of yoke components: 150 pieces The test pieces thus deburred were subjected to nickel plating. The shearing burrs on usual ridge line portions, shearing burrs on ridge line portions at opening edges of the through-hole (diameter: 3 mm), and whisker-like burrs in the rolled-tap (diameter: 2.5 mm) of each test piece were observed. The results are shown in Table 2.

For comparison, the following comparative test pieces were prepared, and deburring states of the test pieces were evaluated in the same manner as described above.

Comparative Example 1

The test pieces were subjected only to the above-described barrel polishing treatment.

Comparative Example 2

The test pieces were subjected to the above-described barrel polishing treatment and the chemical polishing treatment.

Comparative Example 4

The test pieces were subjected only to the above-described thermal deburring treatment.

The chemical polishing treatment was performed in accordance with the same manner as that described in Inventive Example 1.

The results are shown in Table 2.

TABLE 2

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| Inventive Example 2 | ~0.1 mm | ⊚ | ~0.1 mm | ○ | ~0.1 mm | ⊚ |
| | 0.1 to 0.5 mm | ⊚ | 0.1 to 0.5 mm | ⊚ | 0.1 to 0.5 mm | ⊚ |
| | 0.5 to 1.0 mm | ⊚ | 0.5 to 1.0 mm | — | 0.5 to 1.0 mm | — |
| Comparative Example 1 | ~0.1 mm | ⊚ | ~0.1 mm | X | ~0.1 mm | X |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 2 | ~0.1 mm | ⊚ | ~0.1 mm | ○ | ~0.1 mm | ○ |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 4 | ~0.1 mm | X | ~0.1 mm | X | ~0.1 mm | ⊚ |
| | 0.1 to 0.5 mm | X | 0.1 to 0.5 mm | X | 0.1 to 0.5 mm | ⊚ |
| | 0.5 to 1.0 mm | X | 0.5 to 1.0 mm | — | 0.5 to 1.0 mm | — |

The meanings of the marks ⊚, ○, Δ, X, — in Table 2 are the same as those of the marks ⊚, ○, Δ, X, — in Table 1.

In Inventive Example 2, the test pieces were subjected to chemical polishing after thermal deburring treatment. As a result, the shearing burrs of 0.1 mm or less shown in Table 2 were perfectly removed.

Inventive Example 3

The same test pieces as those used in Inventive Example 1 were subjected in sequence to a rotary barrel polishing treatment and a magnetic polishing treatment in the following conditions:

Deburring Step by Rotary Barrel Polishing Treatment charged amount of yoke components: 50 pieces+30 g
charged amount of spherical abrasive grains mainly made from alumina or silica (outside diameter; 15 mm): 5 kg
number of revolution: 46 rpm
polishing time: 1 hr Magnetic Polishing Treatment material of media: SUS304 (specified in JIS)
shape of media: φ0.5×5L (mm)
charged amount of media: 1 kg
dimension of vessel: φ300×150H (mm)

Under the above conditions, each yoke component was fixed to a Teflon made jig in an upright state in the vessel and the media and water were put in the vessel, and then the media was stirred and vibrated by alternately changing N and S poles of a magnetic field at 60 Hz for 10 min.

The test pieces thus deburred were subjected to nickel plating. The shearing burrs on usual ridge line portions, shearing burrs on ridge line portions at opening edges of the through-hole (diameter: 3 mm), and whisker-like burrs in the rolled-tap (diameter: 2.5 mm) of each test piece were observed. The results are shown in Table 3.

For comparison, the following comparative test pieces were prepared, and deburring states of the test pieces were evaluated in the same manner as described above.

Comparative Example 1

The test pieces were subjected only to the above-described barrel polishing treatment.

Comparative Example 2

The test pieces were subjected to the above-described barrel polishing treatment and the chemical polishing treatment.

Comparative Example 5

The test pieces were subjected only to the above-described magnetic polishing treatment.

The chemical polishing treatment was performed in accordance with the same manner as that described in Inventive Example 1.

The results are shown in Table 3.

TABLE 3

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| Inventive Example 3 | ~0.1 mm | ◎ | ~0.1 mm | ○ | ~0.1 mm | ◎ |
|  | 0.1 to 0.5 mm | ◎ | 0.1 to 0.5 mm | ◎ | 0.1 to 0.5 mm | ◎ |
|  | 0.5 to 1.0 mm | ◎ | 0.5 to 1.0 mm | — | 0.5 to 1.0 mm | — |
| Comparative Example 1 | ~0.1 mm | ◎ | ~0.1 mm | X | ~0.1 mm | X |
|  | 0.1 to 0.5 mm | ◎ | 0.1 to 0.5 mm | X | 0.1 to 0.5 mm | X |
|  | 0.5 to 1.0 mm | ◎ | 0.5 to 1.0 mm | — | 0.5 to 1.0 mm | — |
| Comparative Example 2 | ~0.1 mm | ◎ | ~0.1 mm | ○ | ~0.1 mm | ○ |
|  | 0.1 to 0.5 mm | ◎ | 0.1 to 0.5 mm | X | 0.1 to 0.5 mm | X |
|  | 0.5 to 1.0 mm | ◎ | 0.5 to 1.0 mm | — | 0.5 to 1.0 mm | — |
| Comparative Example 5 | ~0.1 mm | X | ~0.1 mm | X | ~0.1 mm | ◎ |
|  | 0.1 to 0.5 mm | X | 0.1 to 0.5 mm | X | 0.1 to 0.5 mm | ◎ |
|  | 0.5 to 1.0 mm | X | 0.5 to 1.0 mm | — | 0.5 to 1.0 mm | — |

The meanings of the marks ◎, ○, Δ, X, — in Table 3 are the same as those of the marks ◎, ○, Δ, X, — in Table 1.

In Inventive Example 3, the test pieces were subjected to chemical polishing after magnetic polishing treatment. As a result, the shearing burrs of 0.1 mm or less shown in Table 3 were perfectly removed.

Inventive Example 4

The same test pieces as those used in Inventive Example 1 were subjected in sequence to a rotary barrel polishing treatment and an ultrasonic deburring treatment in the following conditions:

Deburring Step by Rotary Barrel Polishing Treatment charged amount of yoke components: 50 pieces+30 g
charged amount of spherical abrasive grains mainly made from alumina or silica (outside diameter: 15 mm): 5 kg
number of revolution: 46 rpm
polishing time: 1 hr Ultrasonic Deburring Treatment frequency of ultrasonic waves: 25 kHz
output of ultrasonic waves: 1,200 W
water temperature: 10° C.
water quality: pure water Under the above conditions, each yoke component was suspended by using a wire, and was subjected to ultrasonic deburring for 1 min while being swung in the vertical direction.

The test pieces thus deburred were subjected to nickel plating. The shearing burrs on usual ridge line portions, shearing burrs on ridge line portions at opening edges of the through-hole (diameter: 3 mm), and whisker-like burrs in the rolled-tap (diameter: 2.5 mm) of each test piece were observed. The results are shown in Table 4.

For comparison, the following comparative test pieces were prepared, and deburring states of the test pieces were evaluated in the same manner as described above.

Comparative Example 1

The test pieces were subjected only to the above-described barrel polishing treatment.

Comparative Example 2

The test pieces were subjected to the above-described barrel polishing treatment and the chemical polishing treatment.

Comparative Example 6

The test pieces were subjected only to the above-described ultrasonic deburring treatment.

The chemical polishing treatment was performed in accordance with the same manner as that described in Inventive Example 1.

The results are shown in Table 4.

TABLE 4

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| Inventive Example 4 | ~0.1 mm | ◎ | ~0.1 mm | ○ | ~0.1 mm | ◎ |
|  | 0.1 to 0.5 mm | ◎ | 0.1 to 0.5 mm | ◎ | 0.1 to 0.5 mm | ◎ |
|  | 0.5 to 1.0 mm | ◎ | 0.5 to 1.0 mm | — | 0.5 to 1.0 mm | — |
| Comparative Example 1 | ~0.1 mm | ◎ | ~0.1 mm | X | ~0.1 mm | X |
|  | 0.1 to 0.5 mm | ◎ | 0.1 to 0.5 mm | X | 0.1 to 0.5 mm | X |

TABLE 4-continued

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| | 0.5 to 1.0 mm | ⊚ | 0.5 to 1.0 mm | — | 0.5 to 1.0 mm | — |
| Comparative Example 2 | ~0.1 mm | ⊚ | ~0.1 mm | ○ | ~0.1 mm | ○ |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 6 | ~0.1 mm | X | ~0.1 mm | X | ~0.1 mm | ⊚ |
| | 0.1 to 0.5 mm | X | 0.1 to 0.5 mm | X | 0.1 to 0.5 mm | ⊚ |
| | 0.5 to 1.0 mm | X | 0.5 to 1.0 mm | — | 0.5 to 1.0 mm | — |

The meanings of the marks ⊚, ○, Δ, X, — in Table 4 are the same as those of the marks ⊚, ○, Δ, X, — in Table 1.

In Inventive Example 4, the test pieces were subjected to chemical polishing after ultrasonic deburring treatment. As a result, the shearing burrs of 0.1 mm or less shown in Table 4 were perfectly removed.

Inventive Example 5

The same test pieces as those used in Inventive Example 1 were subjected in sequence to a rotary barrel polishing treatment and a water jet deburring treatment in the following conditions:

Deburring Step by Rotary Barrel Polishing Treatment charged amount of yoke components: 50 pieces+30 g
charged amount of spherical abrasive grains mainly made from alumina or silica (outside diameter: 15 mm): 5 kg
number of revolution: 46 rpm
polishing time: 1 hr Water Jet Deburring Treatment bore diameter of nozzle: 0.3 mm (direct-jet type)
discharge pressure: 500 kg/cm$^2$
distance between nozzle and yoke component: 50 mm
discharged amount of high pressure water: 20 L/min
discharge time of high pressure water: 2 sec Under the above conditions, the nozzle was positioned to each of the two through-holes (diameter: 3 mm) and one rolled tap (diameter: 2.5 mm), and each of the through-holes and rolled tap was deburred by a water jet for 2 sec.

The test pieces thus deburred were subjected to nickel plating. The shearing burrs on usual ridge line portions, shearing burrs on ridge line portions at opening edges of the through-hole (diameter: 3 mm), and whisker-like burrs in the rolled-tap (diameter: 2.5 mm) of each test piece were observed. The results are shown in Table 5.

For comparison, the following comparative test pieces were prepared, and deburring states of the test pieces were evaluated in the same manner as described above.

Comparative Example 1

The test pieces were subjected only to the above-described barrel polishing treatment.

Comparative Example 2

The test pieces were subjected to the above-described barrel polishing treatment and the chemical polishing treatment.

Comparative Example 7

The test pieces were subjected only to the above-described water jet deburring treatment.

The chemical polishing treatment was performed in accordance with the same manner as that described in Inventive Example 1.

The results are shown in Table 5.

TABLE 5

| state of burr | ridge line on outer periphery shearing burr | | ridge line at edge of through-hole (diameter: 3 mm) shearing burr | | ridge line in rolled-tap (diameter: 2.5 mm) whisker-like burr | |
|---|---|---|---|---|---|---|
| Inventive Example 5 | ~0.1 mm | ⊚ | ~0.1 mm | ○ | ~0.1 mm | ⊚ |
| | 0.1 to 0.5 mm | ⊚ | 0.1 to 0.5 mm | ⊚ | 0.1 to 0.5 mm | ⊚ |
| | 0.5 to 1.0 mm | ⊚ | 0.5 to 1.0 mm | — | 0.5 to 1.0 mm | — |
| Comparative Example 1 | ~0.1 mm | ⊚ | ~0.1 mm | X | ~0.1 mm | X |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 2 | ~0.1 mm | ⊚ | ~0.1 mm | ○ | ~0.1 mm | ○ |
| | 0.1 to 0.5 mm | ⊚ | 0.1 to 0.5 mm | X | 0.1 to 0.5 mm | X |
| | 0.5 to 1.0 mm | ⊚ | 0.5 to 1.0 mm | — | 0.5 to 1.0 mm | — |
| Comparative Example 7 | ~0.1 mm | X | ~0.1 mm | X | ~0.1 mm | ⊚ |
| | 0.1 to 0.5 mm | X | 0.1 to 0.5 mm | X | 0.1 to 0.5 mm | ⊚ |
| | 0.5 to 1.0 mm | X | 0.5 to 1.0 mm | — | 0.5 to 1.0 mm | — |

The meanings of the marks ⊚, ○, Δ, X, — in Table 5 are the same as those of the marks ⊚, ○, Δ, X, — in Table 1.

In Inventive Example 5, the test pieces were subjected to chemical polishing after water jet deburring treatment. As a result, the shearing burrs of 0.1 mm or less shown in Table 5 were perfectly removed.

As described above, the deburring method of the present invention is effective to remove burrs on all ridge lines, including burrs on ridge lines at finely machined portions, of a yoke component for making up a magnetic circuit of a voice coil motor for a hard disk drive, and therefore, such a method is also effective to manufacture a clean voice coil motor from which burrs harmful to a hard disk drive are removed.

While the preferred embodiments of the present invention have been described using the specific terms, such description is for illustrative purposes only, and it is to be understood that changes and variations may be made without departing from the spirit or scope of the following claims.

What is claimed is:

1. In a yoke component comprising a low carbon steel configured as a magnetic circuit of a voice coil motor for a hard disk drive, wherein said yoke component has a finely machined portion comprising a ridge line, the improvement comprising the absence of any burr of 0.1 mm or greater in thickness on any ridge line of said finely machined portion of said yoke component, due to said yoke component being polished by a barrel polishing treatment followed by an abrasive grain fluidization treatment, a thermal deburring treatment, magnetic polishing treatment, an ultrasonic deburring treatment, or a water jet deburring treatment.

2. A voice coil motor for a hard disk drive, comprising: a yoke component, made from a low carbon steel, configured as a magnetic circuit of said voice coil motor, wherein said yoke component is polished by a barrel polishing treatment followed by an abrasive grain fluidization treatment, a thermal deburring treatment, a magnetic polishing treatment, an ultrasonic deburring treatment, or a water jet deburring treatment, so that said yoke component has on any ridge line of a finely machined portion thereof no burr of 0.1 mm or greater in thickness.

3. A yoke component comprising a low carbon steel configured as a magnetic circuit of a voice coil motor for a hard disk drive, wherein said yoke component is polished by barrel polishing treatment followed by an abrasive grain fluidization treatment, a thermal deburring treatment, a magnetic polishing treatment, an ultrasonic deburring treatment, or a water jet deburring treatment, so that said yoke component has no burr on any ridge line of a finely machined portion thereof.

4. A voice coil motor for a hard disk drive, comprising: a yoke component, made from a low carbon steel, configured as a magnetic circuit of said voice coil motor, wherein said yoke component is polished by a barrel polishing treatment followed by an abrasive grain fluidization treatment, a thermal deburring treatment, a magnetic polishing treatment, an ultrasonic deburring treatment, or a water jet deburring treatment, so that said yoke component has no burr on any ridge line of a finely machined portion thereof.

5. A voice coil motor for a hard disk drive, comprising: a yoke component, made from a low carbon steel, configured as a magnetic circuit of said voice coil motor, wherein said yoke component has on any ridge line of a finely machined portion thereof no shearing burr or whisker-like burr of 0.1 mm or greater in thickness.

6. A yoke component comprising a low carbon steel configured as a magnetic circuit of a voice coil motor for a hard disk drive, wherein said yoke component has no shearing burr or whisker-like burr on any ridge line of a finely machined portion thereof.

* * * * *